United States Patent
Akatsu et al.

(10) Patent No.: US 6,921,580 B2
(45) Date of Patent: Jul. 26, 2005

(54) POLYESTER FILM FOR DISPLAY

(75) Inventors: Kazuyuki Akatsu, Sakata-gun (JP); Kanae Shinjo, Sakata-gun (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 10/459,049

(22) Filed: Jun. 10, 2003

(65) Prior Publication Data

US 2003/0235704 A1 Dec. 25, 2003

(30) Foreign Application Priority Data

Jun. 12, 2002 (JP) ........................................ 2002-170739

(51) Int. Cl.$^7$ .......................... B32B 27/08; B32B 27/18; B32B 27/36
(52) U.S. Cl. ........................ 428/480; 359/350; 359/361; 359/601
(58) Field of Search ................................ 428/480, 910; 359/350, 359, 361, 601

(56) References Cited

U.S. PATENT DOCUMENTS

| | | | | |
|---|---|---|---|---|
| 5,705,601 A | * | 1/1998 | Ueda et al. ............. 528/308.2 |
| 6,242,081 B1 | * | 6/2001 | Endo ........................... 428/212 |
| 6,316,531 B1 | * | 11/2001 | Garware et al. ............... 524/91 |
| 6,458,467 B1 | * | 10/2002 | Mizuno et al. ............. 428/480 |
| 6,482,501 B2 | * | 11/2002 | Mizuno et al. ............. 428/141 |
| 6,511,738 B2 | * | 1/2003 | Koyama et al. ............ 428/216 |
| 6,733,863 B1 | * | 5/2004 | Mizuno et al. ............. 428/143 |
| 2003/0068511 A1 | * | 4/2003 | Murschall et al. .......... 428/480 |

* cited by examiner

*Primary Examiner*—Vivian Chen
(74) *Attorney, Agent, or Firm*—Edwards & Angell, LLP; David G. Conlin; Lisa Swiszcz Hazzard

(57) ABSTRACT

The present invention relates to a polyester film for display comprising:

a polyester film substrate containing an ultraviolet light absorber; and a coating layer formed on at least one surface of said polyester film substrate, said polyester film having a haze of not more than 2.0% and a light transmittance at 380 nm of not more than 5.0%.

16 Claims, No Drawings

POLYESTER FILM FOR DISPLAY

BACKGROUND OF THE INVENTION

The present invention relates to a polyester film suitably used for display.

Biaxially stretched polyester films have been used in various applications such as packaging materials, electrical insulating materials, metal-deposited materials, printing plate materials, magnetic recording materials, display materials, transfer materials and window attaching materials because these films are excellent in transparency, dimensional stability, mechanical properties, heat resistance, electric properties, chemical resistance, etc.

In particular, the polyester films have been recently used in various optical applications such as base films for transparent touch panels and prism sheets used in liquid crystal displays as well as base films for protective films provided with functional layers such as antistatic layer, anti-reflective layer and electromagnetic shielding layer which are attached on the surface of a front panel glass of so-called flat displays such as cathode ray tubes, LCD and PDP.

In recent years, there are increasing demands for display panels such as plasma display panels which are used in various electronic devices such as large scale televisions of wall-mounting type, and it is expected that such demands are more and more increased in future.

In the plasma display panels, when a mixed gas of xenon and neon is excited by electric discharge, vacuum ultraviolet rays are irradiated therefrom to excite fluorescent materials from which red, blue and green lights are then respectively emitted. However, it is known that when the exited neon atoms return to the ground state, so-called neon-orange light having mainly a wavelength of about 600 nm is emitted ("Journal of Image Information Media Institute", Vol. 51, No. 4, pp. 459 to 463 (1997)). Thus, the plasma display panels have such a problem that sufficiently clear red color is not obtainable due to the mixing of red and orange colors. To solve this problem, the plasma display panels are provided on a front surface thereof with a color filter for color correction which contains dyes having a maximum light absorption at 560 to 600 nm, thereby improving absorption to the neon-orange light and allowing the plasma display panels to exhibit a clear red color.

In order to prevent the dyes used in the color filter from being deteriorated upon exposure to ultraviolet light (from display and/or outer atmospheric side), there has been studied such a method of imparting a ultraviolet shielding function to a polyester film itself that is used as a protective film for a front panel of the plasma display, by incorporating an ultraviolet light absorber thereinto.

However, in general, the polyester film containing the ultraviolet light absorber exhibits a strong yellowish color. Therefore, if the polyester film is used as a protective film for a front panel of the plasma display, there arises such a problem that the color correction function of the color filter is adversely affected by the ultraviolet light absorber added thereto.

Further, the color filter using the polyester film made of polyethylene terephthalate suffers from deterioration of dyes contained therein upon exposure to ultraviolet light because the polyethylene terephthalate has a high transmittance in the ultraviolet range. For this reason, there has been studied the method of providing an adhesive layer having an ultraviolet light absorbing effect in the color filter, or the like (Japanese Patent Application Laid-Open (KOKAI) No. 2001-159711, etc.).

However, since the adhesive layer has merely a low ultraviolet light absorbing effect, a considerable amount of the ultraviolet light absorber must be blended therein in order to allow the adhesive layer to exhibit a sufficient ultraviolet light absorbing effect. However, when a large amount of the ultraviolet light absorber is blended in the adhesive layer, there arises such a problem that the adhesion property inherent to the adhesive layer is deteriorated. Therefore, the ultraviolet light absorber is blended in the adhesive layer only in a limited amount.

SUMMARY OF THE INVENTION

An object of the present invention is to provide a useful polyester film having a low ultraviolet light transmittance, a high light resistance, a less yellowish color and an excellent color tone, and further exhibiting an excellent appearance, a less visible interference patterns and an excellent adhesion to a hard coat layer when used, for example, as an optical film.

As a result of the present inventors' earnest study to attain the above aim, it has been found that the above object can be readily achieved by a polyester film using an ultraviolet light absorber and having specific optical properties. The present invention has been attained based on the above finding.

In a first aspect of the present invention, there is provided a polyester film for display comprising:

a polyester film substrate containing an ultraviolet light absorber; and a coating layer formed on at least one surface of said polyester film substrate, said polyester film having a haze of not more than 2.0% and a light transmittance at 380 nm of not more than 5.0%.

In a second aspect of the present invention, there is provided a polyester film for display comprising:

a polyester film substrate containing a benzoxazinone-based ultraviolet light absorber; and a coating layer formed on at least one surface of said polyester film substrate, said polyester film having a haze of not more than 2.0% and a light transmittance at 380 nm of not more than 5.0%.

In a third aspect of the present invention, there is provided a polyester film for display comprising:

a polyester film substrate comprising at least three layers and containing an ultraviolet light absorber in an intermediate layer; and a coating layer formed on at least one surface of said polyester film substrate, said polyester film having a haze of not more than 2.0%, a light transmittance at 380 nm of not more than 5.0% and a total light transmittance of not less than 75%.

In a fourth aspect of the present invention, there is provided An anti reflective film for display comprising a polyester film comprising:

a polyester film substrate containing an ultraviolet light absorber; and a coating layer formed on at least one surface of said polyester film substrate, said polyester film having a haze of not more than 2.0% and a light transmittance at 380 nm of not more than 5.0%.

DETAILED DESCRIPTION OF THE INVENTION

The present invention is described in detail below.

The polyester film for display according to the present invention may have a single layer structure or a multi-layer structure having three or more layers. The polyester film for or display according to the present invention is a film produced by extruding a molten polyester through an extrusion nozzle or produced by a so-called co-extrusion method in which whole layers are co-extruded in a molten state through the extrusion nozzles. If required, the polyester film may be biaxially stretched in longitudinal and transverse directions thereof. Meanwhile, although the laminated polyester film having a three layer structure is described below, the present invention is not limited thereto, and such polyester films of a multi-layer structure having four or more layers are also involved in the scope of the present invention as long as the above object can be attained. In the laminated polyester film, outermost layers means two surface layers exposed outside immediately after extruded through the nozzle, and the remaining layers other than the outermost layers are referred to as inner layers.

The "polyester" used in the present invention includes those produced by polycondensing an aromatic dicarboxylic acid with an aliphatic glycol. Examples of the aromatic dicarboxylic acid may include terephthalic acid, 2,6-naphthalenedicarboxylic acid or the like. Examples of the aliphatic glycol may include ethylene glycol, diethylene glycol, 1,4-cyclohexane dimethanol or the like. Typical examples of the polyester may include polyethylene terephthalate (PET), polyethylene-2,6-naphthalenedicarboxylate (PEN) or the like.

The polyester used in the present invention may be in the form of either a homopolyester or a copolyester. The copolyester means a copolymer containing not more than 30 mol % of a third component(s). Examples of the dicarboxylic acid component used in the copolyester may include isophthalic acid, phthalic acid, terephthalic acid, 2,6-naphthalenedicarboxylic acid, adipic acid, sebacic acid and oxycarboxylic acids such as p-oxybenzoic acid. These dicarboxylic acids may be used alone or in combination of any two or more thereof. Examples of the glycol component may include ethylene glycol, diethylene glycol, propylene glycol, butane diol, 1,4-cyclohexane dimethanol, neopentyl glycol or the like. These glycols may be used alone or in combination of any two or more thereof.

The polyester composition used in the present invention have a viscosity (intrinsic viscosity: IV) of usually 0.52 to 0.75, preferably 0.55 to 0.75, more preferably 0.58 to 0.75. When the IV value is less than 0.52, the obtained film tends to be deteriorated in heat resistance, mechanical strength, etc., which are inherent excellent properties of the polyester film. When the IV value is more than 0.75, the extrusion process for production of the polyester film tends to require a too large load, resulting in poor productivity.

The polyester film of the present invention has a haze of usually not more than 2.0%, preferably not more than 1.5%, more preferably not more than 1.0%. When the haze of the polyester film is more than 2.0%, the obtained film tends to be deteriorated in transparency, and may become unpractical, especially when used in optical applications.

The polyester film for display according to the present invention has a total light transmittance of usually not less than 75%, preferably not less than 85%.

The polyester film for display according to the present invention has a color tone b* value of usually not more than 1.5, preferably not more than 1.0, more preferably not more than 0.8 as measured with respect to a single sheet by the transmission method. When the b* value is more than 1.5, the obtained film shows a strong yellowish color and, therefore, may be unusable as a polyester film for display.

The polyester film substrate constituting the polyester film of the present invention contains an ultraviolet light absorber in an amount of usually 0.01 to 10% by weight, preferably 0.2 to 5.0% by weight, more preferably 0.3 to 1.8% by weight. When the content of the ultraviolet light absorber in the polyester film substrate is less than 0.01% by weight, the dyes contained in the color filter tend to be deteriorated by ultraviolet light transmitted through the polyester film. Even though the content of the ultraviolet light absorber exceeds 10.0% by weight, the effect of preventing deterioration of the dyes may not be further improved since the effect is already saturated. On the contrary, the ultraviolet light absorber tends to bleed out onto the surface of the film (in the case of the laminated film, bleeding out on the surface of the film after penetrating through surface layers covering the intermediate layer), resulting in deteriorated surface properties such as poor adhesion strength.

The polyester film of the present invention has a light transmittance at 380 nm of usually not more than 5.0%, preferably not more than 2.0%, most preferably not more than 1.0%. When the light transmittance at 380 nm of the polyester film is more than 5.0%, it may be difficult to sufficiently prevent the dyes contained in the color filter from being deteriorated due to ultraviolet light transmitted through the polyester film.

Examples of the ultraviolet light absorber used in the present invention may include benzophenone derivatives, 1,3,5-triazine derivatives, benzoxazinone derivatives or the like. These ultraviolet light absorbers may be used alone or in combination of any two or more thereof, though not limited thereto. If two or more ultraviolet light absorbers are used in combination, it is preferable that the total amount of these ultraviolet light absorbers used is in the range of 0.1 to 10.0% by weight.

The ultraviolet light absorber used in the present invention preferably has a molecular weight of 300 to 1,000. When the molecular weight of the ultraviolet light absorber is less than 300, it may be difficult to mold the obtained polyester since it suffers from sublimation, fuming, etc upon melt-molding process therefor. In addition, even though such an ultraviolet light absorber is incorporated into the intermediate layer of the three-layer laminated film, the ultraviolet light absorber tends to penetrate through the surface layers and bleed out on the surface of the film. When the molecular weight of the ultraviolet light absorber is more than 1,000, it may be difficult to dissolve such an ultraviolet light absorber in the polyester, resulting in increased haze of the obtained film.

Examples of the preferred benzophenone derivatives used in the present invention may include those compounds containing two 2-hydroxy-4-alkoxybenzophenones bonded to each other via a methylene group. Specific examples of the benzophenone derivatives may include bis(5-benzoyl-4-hydroxy-2-methoxyphenol)methane, bis(5-benzoyl-4-hydroxy-2-butoxyphenol)methane or the like.

Examples of the preferred 1,3,5-triazine derivatives may include triphenyl-1,3,5-triazines in which at least one of the three benzene rings has phenolic hydroxyl substituent groups bonded to its ortho-positions. Specific examples of the 1,3,5-triazine derivatives may include 2-(4,6-diphenyl- 1,3,5-triazine-2-yl)-5-[(hexyl)oxy]-phenol, 2-(4,6-diphenyl-1,3,5-triazine-2-yl)-5-[(octyl)oxy]-phenol or the like.

Examples of the benzoxazinone-based compounds used in the present invention may include those compounds represented by the following structural formula:

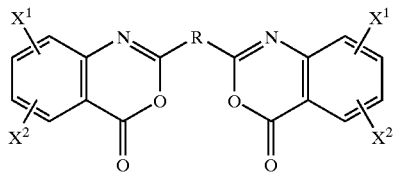

wherein R is a divalent aromatic hydrocarbon residue; and $X^1$ and $X^2$ are independently hydrogen or at least one functional group selected from the group consisting of alkyl, aryl, heteroaryl, halogen, alkoxy, aryloxy, hydroxy, carboxyl, ester and nitro, though not particularly limited thereto.

Of these compounds represented by the above structural formula, especially preferred is 2,2'-(1,4-phenylene)bis[4H-3,1-benzoxazine-4-one].

The polyester film of the present invention is provided on at least one surface thereof with a coating layer, and has on the coating layer, an absolute reflectance difference ΔR (specifically represented by the following formula) of usually not more than 2.0%, preferably not more than 1.7%, more preferably not more than 1.5%.

$$\Delta R = Rs - Rc(\min.)$$

wherein Rs is an average value of absolute reflectance values as measured on a surface of the coating layer in a wavelength range of 2,400 to 2,000 nm; and Rc(min.) is a minimum value of absolute reflectance values as measured on a surface of the coating layer in a wavelength range of 300 to 800 nm.

When the absolute reflectance difference ΔR is more than 2.0%, the film provided thereon with a hard coat layer tends to suffer from clearly visible interference patterns, resulting in poor appearance of the obtained film.

The hard coat material of either a thermosetting resin type or an activated energy-cured resin type may have substantially the same effect of rendering the interference patterns less visible. The effect is more remarkably exhibited when the hard coat layer has a refractive index of 1.59 to 1.50, preferably 1.58 to 1.52.

The polyester film of the present invention has a total thickness of usually 50 to 300 μm, preferably 75 to 250 μm. When the total thickness of the polyester film is less than 50 μm, the obtained film tends to show a poor stiffness. As a result, when the polyester film is punched into each sheet, the obtained sheet tends to suffer from poor workability upon final inspection for each sheet or upon attachment onto displays. When the total thickness of the polyester film is more than 300 μm, the obtained film tend to show a too large rigidity, also resulting in poor workability.

In the polyester film of the present invention, the total amount of oligomers (cyclic trimers) precipitated on front and rear surfaces thereof after heat-treating the film at 180° C. for 10 minutes, is preferably not more than 15.0 mg/m$^2$, more preferably not more than 10.0 mg/m$^2$, most preferably not more than 8.0 mg/m$^2$. When the total amount of the oligomers precipitated on the surfaces of the film is more than 15.0 mg/m$^2$, the obtained film tends to be deteriorated in haze due to the heat history upon processing. In order to improve a durable adhesion strength to the hard coat layer, it is also preferable that the total amount of the oligomers precipitated on the surfaces of the film is not more than 15.0 mg/m$^2$.

In order to control the total amount of oligomers precipitated on the surfaces of the film to the above-specified range, there may be used polyesters having a low oligomer content. In the case of the laminated film produced by the co-extrusion method, when the polyesters having a low oligomer content are used for production of the outermost layer, it becomes possible to limit the total amount of oligomers precipitated on the surfaces of the film obtained after heat treatment, to the above-specified range. More specifically, when the amount of oligomers contained in the raw polyesters is reduced to not more than 5,000 ppm, preferably not more than 4,000 ppm, more preferably not more than 3,000 ppm, it is possible to prevent the oligomers from being precipitated on the surfaces of the film upon heating.

It is known that the amount of oligomers contained in the raw polymers is increased at a melting step of the film forming process, etc. The increment of oligomers contained in the raw polymers tends to be strongly influenced by water content in the polymers, temperature used upon melting, residence time or the like, and the amount of oligomers is considered to be increased by about 100 to 5,000 ppm.

In order to control the amount of oligomers precipitated on the surfaces of the film to the above-specified range, the amount of oligomers contained in the raw polyesters is not more than 4,000 ppm, preferably not more than 3,000 ppm, more preferably not more than 2,500 ppm.

As the method of reducing the amount of oligomers contained in the polyester, there may be used conventionally known solid phase polymerization method.

In the case of the laminated film, each outermost layer has a thickness of usually not less than 3 μm which is however preferably not more than ¼ of the total thickness of the film. When the thickness of the outermost layer is less than 3 μm, the oligomers (cyclic trimers) contained in the inner layer thereof tend to be precipitated on the surfaces of the film due to the heat history during processing, resulting in contaminated production line or increased haze of the film. When the thickness of the outermost layer is more than ¼ of the total thickness of the film, the obtained film tends to show an increased haze value (especially internal haze value) due to lubricant particles contained in the outermost layer for improving a roll-up property of the film, resulting in deteriorated transparency of the film.

The laminated film preferably has a multi-layer structure having at least three layers. In this case, the benzoxazinone-based compound is preferably blended in the intermediate layer. When the benzoxazinone-based compound is blended in the intermediate layer, the benzoxazinone-based compound can be prevented from bleeding out onto the surfaces of the film, so that properties of the film such as adhesion strength can be well maintained.

The average particle size of the particles blended in the polyester film is usually 0.02 to 3 μm, preferably 0.02 to 2.5 μm, more preferably 0.02 to 2 μm, though not particularly limited thereto. When the average particle size of the particles blended is less than 0.02 μm, the obtained film tends to have a too flat surface, resulting in deteriorated roll-up property of the film upon the film forming process. When the average particle size of the particles blended is more than 3 μm, the obtained film tends to have a too coarse surface, resulting in increased haze of the film.

In the present invention, the particles may be blended in the polyester by known methods without any particular limitations. For example, the particles may be added to the polyester at any optional stage during the polyester production process. Preferably, the particles in the form of a slurry prepared by dispersing the particles in ethylene glycol, etc., are added at the stage after completion of the esterification reaction or transesterification reaction but before initiation of the polycondensation reaction. Further, the particles may be added to the polyester by the method of blending a slurry prepared by dispersing the particles in ethylene glycol or water, with the raw polyester using a vented kneading extruder, the method of blending the dried particles with the raw polyester using a kneading extruder, or the like.

The polyester film of the present invention has a shrinkage percentage of preferably not more than 2.0%, more preferably not more than 1.7%, most preferably not more than 1.5% in each of the longitudinal and transverse directions of the film after being heat-treated at 100° C. for 5 minutes. When the shrinkage percentage of the polyester film is more than 2.0%, the obtained film tends to suffer from curling after providing the hard coat layer thereon.

Next, the process for producing the polyester film according to the present invention is specifically described, though not particularly limited thereto.

Dried polyester chips obtained by known methods are fed into a melting extruder, and then heated to a temperature more than melting points of the respective polymers to obtain molten polymers. Successively, the molten polymers are extruded from a die, and rapidly cooled and solidified on a rotary cooling drum until reaching the temperature not more than the glass transition temperature thereof, thereby obtaining a substantially amorphous unstretched sheet. In this case, in order to improve a flatness of the sheet, it is preferable to bring the sheet and the rotary cooling drum into close contact with each other. In the present invention, for the purpose of achieving the close contact between the sheet and the rotary cooling drum, there may be preferably used an electrostatic contact method and/or a liquid-coating contact method.

Then, the thus obtained unstretched sheet is biaxially stretched to form a stretched film. More specifically, the biaxial stretching of the sheet is conducted as follows. First, the unstretched sheet is stretched at a temperature of 70 to 145° C. and a draw ratio of 2 to 6 times in the longitudinal direction thereof, thereby obtaining a longitudinally monoaxially stretched film. Successively, the monoaxially stretched film is stretched at a temperature of 90 to 160° C. and a draw ratio of 2 to 6 times in the transverse direction thereof, thereby obtaining a biaxially stretched film. The thus obtained biaxially stretched film is preferably heat-treated at a temperature of 150 to 240° C. for 1 to 600 seconds. Upon the heat treatment, the film is preferably annealed at a relaxation percentage of 0.1 to 20% in the longitudinal and/or transverse directions at the maximum heat-treating temperature zone and/or the heat-treating outlet cleaning zone. Further, if required, the obtained film may be subjected to longitudinal re-stretching step or transverse re-stretching step.

The polyester film of the present invention is provided on one or both surfaces thereof with a coating layer. The coating layer is provided for the purposes of improving the adhesion to the hard coat layer, imparting an antistatic property thereto, etc. The coating layer may be formed by an in-line coating method, an off-line coating method or the combination thereof. In particular, the use of the in-line coating method is preferred because the formation of the coating layer can be performed during a series of operations in the above film production process. More specifically, in the in-line coating method, after a coating solution is applied onto the film upon completion of the longitudinal stretching, the coating solution is spread-coated before reaching an inlet of a tenter (before completion of orientated crystallization), and then dried, preheated and stretched in the transverse direction in the tenter, followed by thermal setting thereof.

As the coating material for the off-line coating method, there may be used either water-based coating materials or solvent-based coating materials. As the coating material for the in-line coating method, there are preferably used water-based coating materials or water dispersion-based coating materials.

Also, when the polyester film of the present invention is used in optical applications, the hard coat layer provided for improving a surface hardness of the film may contain various additives such as antistatic agents, colorants and conductive materials in order to impart various other functions thereto. In addition, the hard coat layer may be further covered with a functional multi-layer thin film for preventing reflection of external light, static shock, dirt adhesion, etc., and further imparting an electromagnetic shielding property thereto.

The coating layer formed on the polyester film of the present invention preferably comprises combination of a cross-linking agent and various binder resins. As the binder resin, at least one polymer selected from the group consisting of polyesters, acrylic polymers and polyurethanes is preferably used from the standpoint of good adhesion property thereof. These polymers may be in the form of derivatives thereof. The derivatives described herein mean copolymers with other polymers, and polymers whose functional groups are reacted with reactive compounds. Meanwhile, although polyvinylidene chloride, chlorinated polyolefins, etc., can form a tough coating film and exhibit a good adhesion property to a topcoat material, the use thereof is undesirable since these compounds contain chlorine and, therefore, tend to generate harmful chlorine-containing compounds such as dioxin upon burning. Moreover, when scraps of the coated films are reused, there arise problems such as discoloration, generation of corrosive gases and the like.

The above polyesters, acrylic polymers and polyurethanes are described in detail below.

First, the polyester-based resins used as the coating material in the present invention may be constituted, for example, by a polycarboxylic acid and a polyhydroxy compound. Examples of the polycarboxylic acid may include terephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassium-sulfo-terephthalic acid, 5-sodium-sulfo-isophthalic acid, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, trimellitic acid monopotassium salt, and ester-forming derivatives thereof. Examples of the polyhydroxy compound may include ethylene glycol, 1,2-propylene glycol, 1,3-propylene glycol, 1,4-butane diol, 1,6-hexane diol, 2-methyl-1,5-pentane diol, neopentyl glycol, 1,4-cyclohexane dimethanol, p-xylylene glycol, bisphenol A-ethylene glycol adduct, diethylene glycol, triethylene glycol, polyethylene glycol, polypropylene glycol, polytetramethylene glycol, polytetramethyleneoxide glycol, dimethylol propionic acid, glycerol, trimethylol propane, sodium dimethylolethylsulfonate, potassium dimethylolpropionate, or the like. The polyester resins may be produced from these compounds by an ordinary polycondensation reaction.

Meanwhile, in the present invention, in addition to the above-described polyester resins, the polyester-based resins may also include composite polymers containing polyester components such as so-called acryl-grafted polyesters as described in Japanese Patent Application Laid-Open (KOAKI) No. 1-165633(1989) and polyester polyurethanes produced by chain-extension of polyester polyols with isocyanates.

The polyester-based resins used in the present invention may form a coating material by dispersing the resins in water as a dispersing medium. The coating material may also be prepared by forcibly dispersing the resins in water using a surfactant, etc., and is preferably used in the form of a self-dispersion type coating material containing hydrophilic nonionic components such as polyethers or cationic groups such as quaternary ammonium salts. More preferably, the coating material is in the form of a water-soluble or water-dispersed polyester-based resin coating material containing anionic groups. The polyesters containing anionic groups are polyesters to which anionic group-containing compounds are bonded by copolymerization, graft reaction, etc. The anionic group-containing compounds may be appropriately selected from sulfonic acids, carboxylic acids, phosphoric acids, and lithium salts, sodium salts, potassium salts, ammonium salts, etc. of these acids.

The amount of the anionic groups contained in the polyester-based resins is preferably 0.05 to 8% by weight. When the amount of the anionic groups is less than 0.05% by weight, the polyester-based resins tend to be deteriorated in water solubility or water dispersibility. When the amount of the anionic groups is more than 8% by weight, the obtained coating layer tends to be deteriorated in water resistance, or tends to show a moisture absorption, resulting in mutual sticking of the obtained film.

The "acrylic polymers" used as the coating material in the present invention are polymers prepared from polymerizable monomers having a carbon-to-carbon double bond such as typically acrylic monomers and methacrylic monomers. These acrylic polymers may be used in the form of either homopolymers or copolymers. Also, the acrylic polymers may include copolymers of the acrylic polymers with other polymers (e.g., polyesters, polyurethanes, etc.), for example, in the form of block copolymers or graft copolymers. Further, the acrylic polymers may also include polymers produced by polymerizing the polymerizable monomers having a carbon-to-carbon double bond in a polyester solution or polyester dispersion (or, in some cases, mixtures of the polymers), polymers produced by polymerizing the polymerizable monomers having a carbon-to-carbon double bond in a polyurethane solution or polyurethane dispersion (or, in some cases, mixtures of the polymers), polymers produced by polymerizing the polymerizable monomers having a carbon-to-carbon double bond in the other polymer solution or other polymer dispersion (or, in some cases, mixtures of the polymers), or the like.

The polymerizable monomers having a carbon-to-carbon double bond are not particularly restricted. Typical examples of the polymerizable monomers having a carbon-to-carbon double bond may include various carboxyl-containing monomers such as acrylic acid, methacrylic acid, crotonic acid, itaconic acid, fumaric acid, maleic acid and citraconic acid, and salts thereof; various hydroxy-containing monomers such as 2-hydroxyethyl(meth)acrylate, 2-hydroxypropyl(meth)acrylate, 4-hydroxybutyl(meth) acrylate, monobutylhydroxyfumarate and monobutylhydroxyitaconate; various (meth)acrylic acid esters such as methyl (meth)acrylate, ethyl (meth)acrylate, propyl (meth) acrylate, butyl (meth)acrylate and lauryl (meth)acrylate; various nitrogen-containing vinyl-based monomers such as (meth)acrylamide, diacetone acrylamide, N-methylol acrylamide and (meth)acrylonitrile; various styrene derivatives such as styrene, α-methyl styrene, divinyl benzene and vinyl toluene; various vinyl esters such as vinyl acetate and vinyl propionate; various silicon-containing polymerizable monomers such as γ-methacryloxypropyl trimethoxysilane, vinyl trimethoxysilane and a methacryloyl silicon macromer "SILAPLANE FM-07" produced by Chisso Co., Ltd.; phosphorus-containing vinyl-based monomers; various halogenated vinyl compounds such as vinyl chloride, vinylidene chloride, vinyl fluoride, vinylidene fluoride, trifluorochloroethylene, tetrafluoroethylene, chlorotrifluoroethylene and hexafluoropropylene; various conjugated dienes such as butadiene; or the like.

The method of producing the polymers from the above acrylic monomers is not particularly restricted, and the polymers may be produced by ordinary methods. For example, the polymers may be produced by mixing various monomers described above with an organic solvent and a polymerization initiator, and heating the mixture under stirring to conduct polymerization of the monomers. Alternatively, the polymers may be produced by dropping various monomers described above and the polymerization initiator into the organic solvent while heating the organic solvent under stirring, to conduct polymerization of the monomers. Further, the polymers may be produced by subjecting various monomers described above, the organic solvent and the polymerization initiator to polymerization reaction in an autoclave under highly pressurized conditions. Furthermore, the polymers may be produced by emulsion polymerization or suspension polymerization using water instead of the above organic solvent, if required, in combination with a surfactant.

The polymerization initiator used for reacting these monomers is not particularly restricted. Typical examples of the polymerization initiator may include inorganic peroxides such as ammonium persulfate and hydrogen peroxide; acyl peroxides such as benzoyl peroxide; tertiary butyl hydroperoxide; various alkylhydroperoxides such as p-menthanehydroperoxide; various dialkylperoxides such as di-tert-butylperoxide; organic peroxides; various azo-based compounds such as azobisisobutylonitrile and azodi-tert-butane; or the like. These organic and inorganic peroxides may be used in combination with a reducing agent as so-called redox catalysts. In this case, the respective components may be made of a single compound or a plurality of compounds. Typical examples of the reducing agent may include organic amines, L-ascorbic acid, L-sorbic acid, cobalt naphthenate, cobalt octenate, iron naphthenate, iron octenate or the like.

In the present invention, as the polyurethane-based resins, there may be used known polyurethane-based resins or similar resins as described in Japanese Patent Publication (KOKOKU) Nos. 42-24194(1967), 46-7720(1971), 46-10193(1971) and 49-37839(1974), Japanese Patent Application Laid-Open (KOKAI) Nos. 50-123197(1975), 53-126058(1978) and 54-138098(1979), etc.

Examples of polyisocyanates as the raw material for the polyurethane-based resins may include tolylene diisocyanate, phenylene diisocyanate, 4,4'-diphenylmethane diisocyanate, hexamethylene diisocyanate, xylylene diisocyanate, 4,4'-dicyclohexylmethane diisocyanate, isophorone diisocyanate or the like.

Examples of the polyols as the raw material for the polyurethane-based resins may include polyether polyols such as polyoxyethylene glycol, polyoxypropylene glycol and polyoxytetramethylene glycol, polyester polyols such as polyethylene adipate, polyethylene-butylene adipate and polycaprolactone, acrylic polyols, polycarbonate-based polyols, castor oil or the like. As the polyols, there are usually used those polyols having a molecular weight of 300 to 2,000.

Examples of the chain extender or cross-linking agent may include ethylene glycol, propylene glycol, butane diol, diethylene glycol, trimethylol propane, hydrazine, ethylene diamine, diethylene triamine, 4,4'-diaminodiphenylemthane, 4,4'-diaminodicyclohexylmethane, water or the like.

The above polyurethane-based resins preferably have anionic substituent groups such as $-SO_3H$, $-OSO_3$, $-COOH$ and ammonium salts, alkali metal salts or alkali earth metal salts thereof for the purpose of improving a solubility thereof in a solvent such as mainly water. The polyurethane-based resins having such anionic substituent groups may be produced, for example, by the following methods (1) to (3), though the present invention is not limited thereto.

(1) Method Using as the Polyisocyanate, Polyol, Chain Extender, Etc., Compounds having Anionic Substituent Groups:

For example, the polyisocyanate having anionic substituent groups may be produced by sulfonating an aromatic isocyanate compound. Also, there may be used isocyanate compounds having sulfate salts or diaminocarboxylic acid salts of amino alcohols.

(2) Method of Reacting a Compound having Anionic Substituent Groups with Unreacted Isocyanate Groups of Polyurethane Produced:

Examples of the compound having anionic substituent groups may include compounds containing as anionic groups, bisufites, aminosulfonic acid and salts thereof, aminocarboxylic acid and salts thereof, esters of sulfuric acid and amino alcohols and salts thereof, hydroxyacetic acid and salts thereof, etc.

(3) Method of Reacting Active Hydrogen Containing Groups of Polyurethane such as OH and COOH with a Specific Compound:

Examples of the specific compound may include dicarboxylic anhydrides, tetracarboxylic anhydrides, sultones, lactones, epoxycarboxylic acid, epoxysulfonic acid, 2,4-dioxo-oxazolidine, isatinic anhydride, phostones or the like. Further, there may also be used 3 to 7-membered ring-containing cyclic compounds having a salt-type group or a group capable of forming a salt after ring opening, such as carbyl sulfate.

Among the polyesters, acrylic polymers and polyurethanes used as the coating material in the present invention, preferred are those polymers having a glass transition temperature (Tg) of not less than 0° C., preferably not less than 40° C. Specifically, among the polyurethanes, preferred are polyester polyurethanes, namely those polymers having carboxyl residues at least a part of which is hydrophilized with amine or ammonia.

The polyester polyurethane is a polyurethane produced by using a polyester as the polyol. When a coating material containing the polyester polyurethane together with the melamine resin of the present invention is used in the in-line coating process, it is possible to form a totally excellent coating film. More specifically, the thus obtained coating film can exhibit a strong adhesion property to a topcoat material, an excellent transparency and an excellent sticking resistance. As the industrially useful polyurethanes, there are known polyether polyurethanes, polycarbonate-based polyurethanes, etc. However, in the consideration of combining with the melamine resin of the present invention, totally preferred are the polyester-based polyurethanes.

Also, the coating solution of the present invention preferably contains a water-soluble organic solvent having a boiling point higher than that of water. When the coating solution containing the water-soluble organic solvent is used, the obtained coating film can be improved in transparency and adhesion to the topcoat material. More specifically, the water-soluble organic solvent has a boiling point of 100 to 300° C. and a solubility in water at 20° C. of not less than 1%. Examples of the water-soluble organic solvent may include n-butyl alcohol, diacetone alcohol, cellosolve acetate, methyl cellosolve, ethyl cellosolve, butyl cellosolve, methyl carbitol, ethyl carbitol, butyl carbitol, 3-methyl-methoxy butanol, ethylene glycol monoisopropyl ether, propylene glycol monomethyl ether, ethylene glycol monoisobutyl ether, texanol, dimethylformamide, N-methyl-2-pyrrolidone or the like.

As the cross-linking agent, there may be generally used melamine-based, epoxy-based and oxazoline-based resins. of these resins, melamine-based resins are especially preferred from the standpoints of coatability and durable adhesion property. Examples of the melamine-based resins may include melamine, methylolated melamine derivatives obtained by condensing melamine and formaldehyde, compounds obtained by partially or completely etherifying methylolated melamine with a lower alcohol, and mixtures thereof.

In addition, as the melamine-based resins, there may also be used condensates of monomers or multimers such as dimers or higher oligomers, or mixtures thereof.

Examples of the preferred lower alcohol used for the above etherification may include methyl alcohol, ethyl alcohol, isopropyl alcohol, n-butanol, isobutanol or the like. The melamine-based resins may contain in a molecule thereof, functional groups such as imino, methylol, and alkoxymethyl, e.g., methoxymethyl and butoxymethyl. Specific examples of such melamine-based resins may include imino-type methylated melamine resins, methylol-type melamine resins, methylol-type methylated melamine resins, full alkyl-type methylated melamine resins or the like. Of these melamine resins, most preferred are methylol-type melamine resins. Further, in order to promote heat-curing of the melamine-based cross-linking agent, there may be used an acid catalyst such as p-toluenesulfonic acid.

The amount of the melamine-based resin as the cross-linking agent blended in the coating material is usually 1 to 50% by weight, preferably 5 to 30% by weight. When the amount of the cross-linking agent is less than 1% by weight, the obtained coating material may fail to have a sufficient durable adhesion property, resulting in insufficient effect of improving the solvent resistance. When the amount of the cross-linking agent is more than 50% by weight, the obtained coating material may fail to have a sufficient adhesion property.

In the present invention, in order to further improve a slip property, an anchoring property, etc., the coating layer may preferably contain inorganic particles or organic particles. The amount of the particles contained in the coating material is usually 0.5 to 10% by weight, preferably 1 to 5% by weight. When the amount of the particles contained in the coating material is less than 0.5% by weight, the obtained coating layer tends to be insufficient in blocking resistance. When the amount of the particles contained in the coating material is more than 10% by weight, the obtained film tends to be deteriorated in transparency, resulting in poor clearness of images.

Examples of the material of the inorganic particles may include silicon dioxide, alumina, zirconium oxide, kaolin, talc, calcium carbonate, titanium oxide, barium oxide, carbon black, molybdenum sulfide, antimony oxide or the like. Of these inorganic particles, silicon oxide particles are preferred in view of inexpensiveness and availability of various particle sizes thereof.

Examples of the material of the organic particles may include polystyrene, polyacrylate and polymethacrylate which are cross-linked by compounds having two or more carbon-to-carbon double bonds in one molecule, such as vinyl benzene.

The above inorganic particles and organic particles may be surface-treated, if required. Examples of the surface-treating agent may include surfactants, dispersant polymers, silane-based coupling agents, titanium-based coupling agents or the like. The amount of the inorganic or organic particles contained in the coating layer may be selected so as not to adversely affect a transparency of the obtained film, and more specifically is preferably not more than 10% by weight, more preferably not more than 5% by weight.

Further, the coating layer may also contain various additives such as antistatic agents, defoaming agents, coatability modifiers, thickening agents, antioxidants, ultraviolet light absorbers, foaming agents, dyes, pigments or the like.

The coating material may contain a small amount of an organic solvent in order to improve dispersibility in water or film-forming property thereof as far as its dispersing medium is composed mainly of water. The organic pigment may be used in such an amount as being dissolved in water. Examples of the organic solvent may include aliphatic or alicyclic alcohols such as n-butyl alcohol, n-propyl alcohol, isopropyl alcohol, ethyl alcohol and methyl alcohol; glycols such as propylene glycol, ethylene glycol and diethylene glycol; glycol derivatives such as n-butyl cellosolve, ethyl cellosolve, methyl cellosolve and propylene glycol monomethyl ether; ethers such as dioxane and tetrahydrofuran; esters such as ethyl acetate and amyl acetate; ketones such as methyl ethyl ketone and acetone; amides such as N-methyl pyrrolidone; or the like. These organic solvents may be used alone or in combination of any two or more thereof.

The coating material may be applied onto the polyester film using a reverse coater, a gravure coater, a rod coater and an air doctor coater as described in Isamu Harazaki "Coating Method" published by Maki Shoten (1979), as well as other coating apparatuses.

The coating layer may be formed on either one or both surfaces of the polyester film. In the case where the above coating layer is formed on one surface of the polyester film, the other surface of the film may be provided, if required, with an additional coating layer having different properties. Meanwhile, the polyester film may be subjected to various treatments such as chemical treatment and discharge treatment before applying the coating material thereonto in order to improve a coatability or adhesion property of the coating material to the film. In addition, the polyester film provided thereon with the coating layer may also be subjected to discharge treatment in order to further improve surface properties thereof.

The final dry thickness of the coating layer is usually 0.02 to 0.5 $\mu$m, preferably 0.03 to 0.3 $\mu$m. When the thickness of the coating layer is less than 0.02 $\mu$m, it may be difficult to sufficiently exhibit the effects of the present invention. When the thickness of the coating layer is more than 0.5 $\mu$m, the obtained film tends to suffer from mutual sticking thereof. In particular, when the obtained coated film is re-stretched to enhance its strength, there is a tendency that the film is stuck to rolls during the stretching process. This sticking problem is more remarkably exhibited in the case of such a film provided on both surfaces thereof with the same coating layers.

Further, the polyester film of the present invention may contain other thermoplastic resins such as polyethylene terephthalate and polytrimethylene terephthalate unless the addition of these resins adversely affect the effects of the present invention. The polyester film of the present invention may also contain various additives such as ultraviolet light absorbers, antioxidants, surfactants, fluorescent brighteners, lubricants, light shielding agents, matting agents, colorants such as dyes and pigments, or the like. Furthermore, the polyester film may contain, if required, inorganic or organic fine particles inert to polyester in order to improve a slip property and wear resistance of the obtained film.

The inorganic or organic fine particles contained in the polyester film have an average particle size of usually 0.02 to 3 $\mu$m, preferably 0.02 to 2.5 $\mu$m, more preferably 0.02 to 2 $\mu$m, though not particularly limited thereto. When the average particle size of the fine particles is less than 0.02 $\mu$m, the obtained film tends to have a too flat surface, resulting in poor roll-up property thereof in the film forming process. When the average particle size of the fine particles is more than 3 $\mu$m, the obtained film tends to have a too coarse surface, resulting in production of hazy films.

Examples of the fine particles contained in the polyester film may include silicon oxide, alumina, calcium carbonate, kaolin, titanium oxide, cross-linked polymer fine particles as described in Japanese Patent Publication (KOKOKU) No. 59-5216(1984), or the like. These particles may be used singly or in combination of any two or more kinds thereof. The amount of the particles contained in the polyester film is usually not more than 1% by weight, preferably 0.01 to 1% by weight, more preferably 0.02 to 0.5% by weight. When the content of the particles is too small, the obtained film tends to have a too flat surface, resulting in poor roll-up property thereof in the film forming process. When the content of the particles is more than 1% by weight, the obtained film tends to have a too coarse surface, resulting in production of hazy films.

In the present invention, the method of blending the particles in the polyester is not particularly restricted, and the blending may be conducted by any suitable known methods. For example, the particles may be added at any optional stage of the polyester production process. Preferably, the particles may be added in the form of a slurry prepared by dispersing the particles in ethylene glycol, etc., at the stage after completion of the esterification or transesterification reaction but before initiation of the polycondensation reaction. Further, there may be used the method of blending a slurry prepared by dispersing the particles in ethylene glycol or water, with the raw polyester using a vented kneading extruder, the method of blending dried particles with the raw polyester using a kneading extruder, or the like.

The polyester film for display according to the present invention is used in an anti reflective film (AR film). The AR film usually comprises: protective film/anti reflective (+antistatic, anti-stain) layer/hard coat (AG (Anti Glare) or clear) layer/base film (polyester film according to the present invention)/adhesive layer/releasing film. Further, the AR film is generally used in an optical filter for plasma display panels (PDP) as one or both outermost layer(s). The optical filter for PDP usually comprises: viewer side—AR film/ glass base plate/color controlling adhesive layer/multi-layer sputtering film/AR film—front side of PDP.

As described in detail above, the polyester film of the present invention can exhibit a low ultraviolet light transmittance, a less yellowish color, a high light resistance, a good adhesion strength to an overlying hard coat layer even under high temperature and humidity conditions, a less visible interference patters after forming the hard coat layer thereon, an excellent appearance when used as optical films, and good adhesiveness suitable in optical applications. Therefore, the polyester film of the present invention has a very high industrial value.

EXAMPLES

The present invention will be described in more detail by reference to the following examples. However, these examples are only illustrative and not intended to limit the present invention thereto. Meanwhile, "part" described in the following Examples and Comparative Examples means "part by weight".

The measuring methods used herein are as follows.

(1) Intrinsic Viscosity of Polyester:

One gram of polyester from which other polymers incompatible with polyester and pigments were removed, was accurately weighed, and dissolved in 100 ml of a mixed solvent composed of phenol and tetrachloroethane (weight ratio: 50:50). The viscosity of the obtained solution was measured at 30° C. to determine an intrinsic viscosity of the polyester.

(2) Average Particle Size ($d_{50}$):

The average particle size was determined from the particle sizes that were measured using a centrifugal precipitation type particle size distribution meter "SA-CP3 Model" manufactured by SHIMADZU CORPORATION, by a precipitation method according to Stokes's law for fluid resistance.

(3) Content of Oligomers (Cyclic Trimers) in Polyester:

A predetermined amount of raw polyester or a polyester film was dissolved in o-chlorophenol. The obtained solution was then re-precipitated with tetrahydrofuran and then filtered to remove linear polyethylene terephthalate therefrom. Then, the resultant filtrate was fed to a liquid chromatographic analyzer "LC-7A" manufactured by SHIMADZU CORPORATION, to measure the amount of oligomers (cyclic trimers) contained in the filtrate. The amount of oligomers (cyclic trimers) contained in polyester was obtained by dividing the measured amount of oligomers contained in the filtrate by the weight of the polyester used for the above measurement.

In the above liquid chromatography, the amount of oligomers (cyclic trimers) was obtained from the ratio between peak areas of a standard specimen and the test specimen by an absolute calibration curve method.

The standard specimen was prepared by accurately weighing preliminarily sampled oligomers (cyclic trimers) and then dissolving the oligomers in accurately weighed DMF (dimethylformamide).

Meanwhile, the conditions of the liquid chromatography are as follows.

Mobile phase A: Acetonitrile;
Mobile phase B: 2% acetic acid aqueous solution;
Column: "MCI GEL ODS 1HU" manufactured by Mitsubishi Chemical Corporation;
Column temperature: 40° C.;
Flow rate: 1 ml/min.; and
Detecting wavelength: 254 nm (4) Heat Treatment of Film:

A Kent paper of A4 size was overlaid on a polyester film to be heat-treated, and both were held together by Gem clips attached at four corners thereof such that the polyester film surface to be measured faced outside.

The polyester film with the Kent paper was placed in an oven and allowed to stand therein at 180° C. in a nitrogen atmosphere for 10 minutes for conducting the heat treatment thereof.

(5) Amount of Oligomers (OL) on the Surface of Polyester Film:

The respective amounts of oligomers present on front and rear surfaces of the polyester film were measured by the following method to measure a total amount thereof. The thus obtained total amount was regarded as the amount of oligomers on the surface of the polyester film.

The heat-treated polyester film was folded and formed into a top-opened rectangular box having a bottom area of 250 $cm^2$. Then, the thus formed box was charged with 10 ml of DMF, and allowed to stand for 3 minutes. Thereafter, the DMF was recovered from the box and fed to a liquid chromatographic analyzer "LC-7A" manufactured by SHIMADZU CORPORATION, to measure the amount of oligomers contained in DMF. The amount of oligomers (mg/$m^2$) present on the surface of the polyester film was obtained by dividing the measured amount of oligomers contained in DMF by the contact area between the film and DMF. The amount of oligomers contained in DMF was obtained from the ratio between peak areas of a standard specimen and the test specimen by an absolute calibration curve method. The standard specimen was prepared by accurately weighing preliminarily sampled oligomers (cyclic trimers) and then dissolving the oligomer in accurately weighed DMF. The concentration of the standard specimen is preferably in the range of 0.001 to 0.01 mg/ml.

Meanwhile, the conditions of the liquid chromatography are as follows.

Mobile phase A: Acetonitrile;
Mobile phase B: 2% acetic acid aqueous solution;
Column: "MCI GEL ODS 1HU" manufactured by Mitsubishi Chemical Corporation;
Column temperature: 40° C.;
Flow rate: 1 ml/min.; and
Detecting wavelength: 254 nm (6) Film Haze:

The turbidity and total light transmittance of the polyester film were measured according to JIS-K7105 using an integrating sphere turbidimeter "NDH-20D" manufactured by Nippon Denshoku Industries Co., Ltd.

(7) Light Transmittance:

The light transmittance of the polyester film was continuously measured at a scanning speed set to LOW and a sampling pitch of 2 nm over a wavelength range of 300 to 700 nm using a spectrophotometer "UV3100" manufactured by SHIMADZU CORPORATION, to detect the light transmittance at 380 nm.

(8) Color Tone b* Value:

Color tone values (L*, a* and b* values) of a single sheet sample of the polyester film were measured by a spectrocolorimeter "SE-2000" manufactured by Nippon Denshoku Industries Co., Ltd. using a C light source at a field of view of 2° by the transmission method to evaluate the yellowness degree thereof based on the b* value.

(9) Evaluation of Color Tone by Visual Observation:

A polyester film of a general type "O300E100" containing no ultraviolet light absorber ("DIAFOIL" (registered trademark) produced by Mitsubishi Polyester Film Corporation) was used as a standard sample, and cut into a sheet of A4 size. The thus obtained cut sheet was placed on a white mount paper and visually compared with a test sample of a polyester film containing an ultraviolet light absorber which was similarly placed on the white mount paper to evaluate a color tone of the test sample according to the following ratings:

A: Substantially same as color tone of the standard sample (good color tone);

B: Slightly discolored (not poor color tone)

C: Remarkably discolored and unpractical (poor color tone)

(10) Film Haze after Heat Treatment:

A polyester film was placed in an oven and allowed to stand therein at 180° C. in a nitrogen atmosphere for 10 minutes for conducting the heat treatment thereof. The turbidity of the heat-treated polyester film was measured according to JIS-K7105 using an integrating sphere turbidimeter "NDH-20D" manufactured by Nippon Denshoku Industries Co., Ltd.

(11) Thickness of Laminated Layer on Polyester Film:

A small piece of a polyester film was fixedly molded in an epoxy resin, and the resultant molded product was cut by a microtome to observe a section of the film on a transmission electronic micrograph. On the microphotograph showing the film section, two interfaces substantially parallel to the surface of the film were observed as shade lines. The distance between each of the two interfaces and the film surface was measured from 10 microphotographs, and an average value of the measured distances was regarded as the thickness of the laminated layer.

(12) Adhesion Strength of Hard Coat:

(Initial Adhesion Strength)

Immediately after forming a hard coat layer on the polyester film, the hard coat layer was cross-cut at intervals of 1 inch in width to form 100 squares thereon. Immediately, the coated film was subjected to a rapid peeling test using Cellotape (registered trademark) three times at the same position of the film. The adhesion strength of the hard coat layer was evaluated by the peeled area thereof according to the following ratings:

A: Number of cross-cut squares peeled=0

B: 1≦Number of cross-cut squares peeled≦10

C: 11≦Number of cross-cut squares peeled≦20

D: 21≦Number of cross-cut squares peeled (Durable Adhesion Strength)

The same procedure as defined for the above evaluation of initial adhesion strength was conducted except that the polyester film having the hard coat layer was aged in an oven under wet heat conditions at 60° C. and 90% RH for 100 hours before the hard coat layer was cross-cut, thereby evaluating the durable adhesion strength.

(13) Interference Patterns:

The polyester film on which the hard coat layer was formed was placed on a black board such that the hard coat layer faced upward. The hard coat layer was irradiated with light from above by a 18 W fluorescent lamp of 3-waveform white day light type to visually observe and evaluate configuration and contrast of interference patterns according to the following ratings:

A: Broad width (not less than about 2 mm) of respective interference patterns and unclear boundary between the patterns;

B: Broad width (not less than about 2 mm) of respective interference patterns but clear boundary between the patterns; and C: Narrow width (less than about 2 mm) of respective interference patterns and unclear boundary between the patterns

(14) ΔR:

A 50 mm-wide black adhesive tape ("NITTO TAPE" produced by Nitto Denko Corporation) was attached onto the surface of the film opposite to its surface on which an adhesive layer was formed (in the case where adhesive layers were formed on both surfaces of the film, the black adhesive tape was attached onto a surface of the film opposite to its surface to be measured. Then, the thus obtained laminate was cut into a sample piece of about 4 cm square at the portion where no air bubbles were trapped, and the 5° absolute reflectance of the adhesive layer was measured using a spectrophotometer "UV3100" manufactured by SHIMADZU CORPORATION (which was of a type installed in a multi-purpose large scale sampling chamber "MPC-3100") under the following conditions:

Measuring wavelength: 300 to 2,400 nm;

Sampling pitch: 2 nm

Scanning speed: Medium

Slit width: 20 nm

Then, the absolute reflectance values were measured at intervals of 2 nm in a wavelength range of 2,400 to 2,000 nm to obtain an average Rs thereof, and the absolute reflectance values were measured in a wavelength range of 300 to 800 nm to obtain a minimum value Rc(min.) thereof. From the thus measured Rs and Rc(min.) values, the difference value ΔR was calculated from the following formula:

$$\Delta R = Rs - Rc(\text{min.})$$

(15) Shrinkage Percentage of Film:

The polyester film was heat-shrunk in a Geer oven maintained at 100° C.±2° C. under no load conditions for 5 minutes, and the shrinkage percentage thereof was calculated from the following formula:

$$\text{Shrinkage percentage } (\%) = (10 - l) \div 10$$

wherein 10 represents 10 cm as an initial length of the film; and l represents a length of the shrunk film.

(16) Evaluation of Discoloration of Film (UV Light Resistance):

A sample film was irradiated with ultraviolet light at 63° C.±3° C. for 500 hours using an ultraviolet light long life fade meter "FAL-3 Model" manufactured by Suga Test Instruments Co., Ltd.

The color tone values (L*, a* and b* values) of the sample film were measured before and after the UV irradiation test, and the discoloration of the film was evaluated by the difference Δb* between the measured b* values showing the yellowness of the film. The less Δb* value indicated the more excellent light resistance. The color tone values were measured using a spectro-colorimeter "SE-2000" manufactured by Nippon Denshoku Industries Co., Ltd., and the light resistance of the film was evaluated according to the following ratings:

A: Δb*≦1.0

B: 1.9≦Δb*

(17) Total Evaluation of Optical Applicability:

From properties such as adhesion strength to the hard coat layer, interference patterns, film haze, light transmittance at 380 nm, color tone, etc., the optical applicability of the polyester film was evaluated according to the following ratings:

A: Extremely excellent color tone and adhesion strength, unclear interference patterns, low light transmittance at 380 nm and low haze, and suitable for optical applications;

B: Good color tone and adhesion strength, low light transmittance at 380 nm and low haze, and suitable for optical applications;

C: Problematic in color tone, adhesion strength, light transmittance at 380 nm and haze, and unsuitable for optical applications.

Polyesters used in the following Examples and Comparative Examples were produced as follows.

Production of Polyester Films:

<Production of Polyester (A)>

100 parts of dimethyl terephthalate and 60 parts of ethylene glycol as starting materials together with 0.09 part of magnesium acetate tetrahydrate as a catalyst were charged into a reactor, and gradually heated from a reaction initiation temperature of 150° C. to 230° C. for 3 hours while distilling off methanol therefrom. After 4 hours, the transesterification reaction between the starting materials was substantially terminated. The obtained reaction mixture was mixed with 0.04 part of ethyl acid phosphate, and then with 0.04 part of antimony trioxide, and subjected to polycondensation reaction for 4 hours. More specifically, the temperature of the reactor was gradually increased from 230° C. to 280° C. and the pressure thereof was gradually reduced until it finally reached 0.3 mmHg. While monitoring the change in agitation power in the reactor after the initiation of the reaction, at the time at which the agitation power reached the value corresponding to the intrinsic viscosity of 0.63, the reaction was stopped and the resultant polymer was discharged from the reactor under nitrogen pressurized condition. As a result, it was confirmed that the obtained polyester (A) had an intrinsic viscosity of 0.63, and the content of oligomers (cyclic trimers) was 0.83% by weight.

<Production of Polyester (B)>

The thus obtained polyester (A) was preliminarily crystallized at 160° C., and then subjected to solid phase polymerization at 220° C. under a nitrogen atmosphere, thereby obtaining a polyester (B) having an intrinsic viscosity of 0.75 and a content of oligomers (cyclic trimers) of 0.24% by weight.

<Production of Polyester (C)>

The same procedure as defined in the above production of polyester (A) was conducted except that after adding 0.04 part of ethyl acid phosphate, a slurry prepared by dispersing 0.02 part of silica particles having an average particle size of 1.6 μm in ethylene glycol as well as 0.04 part of antimony trioxide were added to the reactor, and the polycondensation reaction was terminated at the time at which the agitation power reached the value corresponding to the intrinsic viscosity of 0.65, thereby obtaining a polyester (C). As a result, it was confirmed that the obtained polyester (C) had an intrinsic viscosity of 0.65, and the content of oligomers (cyclic trimers) therein was 0.82% by weight.

<Production of Polyester (D)>

The polyester (A) was supplied into a vented twin-screw extruder to which 2,2'-(1,4-phenylene)bis[4H-3,1-benzoxazine-4-one]as an ultraviolet light absorber (benzoxazinone-based compound "CYASORB UV-3638" produced by Cytec Inc.; molecular weight: 369) was further added in an amount of 10% by weight. The resultant mixture was melt-kneaded in the extruder and formed into chips, thereby obtaining a UV absorber-containing master batch polyester (D). As a result, it was confirmed that the obtained polyester (D) had an intrinsic viscosity of 0.59.

<Production of Polyester (E)>

The polyester (A) was supplied into a vented twin-screw extruder to which bis(5-benzoyl-4-hydroxy-2-methoxyphenyl)methane as an ultraviolet light absorber (benzophenone-based compound "ADEKA STAB LA-51" produced by Asahi Denka Kogyo Co., Ltd.; molecular weight: 469) was further added in an amount of 20% by weight. The resultant mixture was melt-kneaded in the extruder and formed into chips, thereby obtaining a UV absorber-containing master batch polyester (E). As a result, it was confirmed that the obtained polyester (E) had an intrinsic viscosity of 0.59.

<Production of Polyester (F)>

The polyester (A) was supplied into a vented twin-screw extruder to which 2-(4,6-diphenyl-1,3,5-triazine-2-yl)-5-[(hexyl)oxy] phenol as an ultraviolet light absorber (1,3,5-triazine-based compound "TINUVIN577FF" produced by Chiba Specialty Chemicals Co., Ltd.; molecular weight: 425) was further added in an amount of 20% by weight. The resultant mixture was melt-kneaded by the extruder and formed into chips, thereby obtaining a UV absorber-containing master batch polyester (F).

<Production of Polyester (G)>

The polyester (A) was supplied into a vented twin-screw extruder to which "DIA RESIN RED HS", "DIA RESIN BLUE H3G" and "DIA RESIN YELLOW F" all produced by Mitsubishi Chemical Corporation were further added in amounts of 1.5% by weight, 2.75% by weight and 0.75% by weight, respectively. The resultant mixture was melt-kneaded by the extruder and formed into chips, thereby obtaining a dye-containing master batch polyester (G).

<Production of Polyester (H)>

100 parts of dimethyl naphthalene-2,6-dicarboxylate, 65 parts of ethylene glycol and 0.09 part of magnesium acetate tetrahydrate were charged into a reactor, and heated to conduct a transesterification reaction therebetween while distilling off methanol therefrom. For 4 hours from the initiation of the reaction, the reaction temperature was raised to 230° C. at which the transesterification reaction was substantially terminated. Successively, the resultant reaction mixture was mixed with 0.04 part of phosphoric acid and 0.04 part of antimony trioxide, and then subjected to polycondensation reaction by an ordinary method, thereby obtaining a polymer having an intrinsic viscosity of 0.55. The thus obtained polymer was then subjected to solid phase polymerization, thereby finally obtaining a polyester (H) having an intrinsic viscosity of 0.63.

Preparation of Coating Material:

Raw water-based coating solutions shown in Table 1 were blended with each other at weight ratios shown in Table 2, thereby obtaining water-based coating materials P1 to P3.

TABLE 1

| Raw coating solution | Composition |
| --- | --- |
| A1 | Polyester dispersion: terephthalic acid/isophthalic acid/5-sodiumn-sulfo-isophthalic acid/ethylene glycol/diethylene glycol/triethylene glycol = 31/16/3/22/21/7 (molar ratio) |
| A2 | Polyester dispersion: terephthalic acid/isophthalic acid/5-sodium-sulfo-isophthalic acid/ethylene glycol/neopentyl glycol = 24/25/1/25/25 (molar ratio) |
| A3 | Polyester dispersion: terephthalic acid/isophthalic acid/5-sodium-sulfo-isophthalic acid/ethylene glycol/1,4-butane diol/diethylene glycol = 28/20/2/35/10/5 (molar ratio) |
| B1 | Emulsified polymer: methyl methacrylate/ethyl acrylate/acrylonitrile/N-methylol methacrylamide = 45/45/5/5 (molar ratio) (emulsifier: anionic surfactant) |
| C1 | "HYDRAN AP" produced by DAINIPPON INK AND CHEMICALS, INCORPORATED |
| D1 | Melamine-based cross-linking agent: hexamethoxymethyl melamine |
| E1 | Inorganic particles: water dispersion of silicon oxide (particle size: 0.06 μm) |

TABLE 2

| Water-based coating material | Composition of solid components blended for coating material (weight ratio) |
|---|---|
| P1 | A3/B1/D1/E1 = 47/20/30/3 |
| P2 | A1/C1/D1/E1 = 20/65/10/5 |
| P3 | A2/B1/D1/E1 = 17/50/30/3 |

Example 1

The above polyesters (B) and (C) were blended with each other in amounts of 90% and 10%, respectively, to prepare a raw mixture for a layer A, and the above polyesters (A) and (D) were blended with each other in amounts of 90% and 10%, respectively, to prepare a raw mixture for a layer B. The raw mixtures were respectively supplied to two extruders, melted at 285° C., and then co-extruded on a casting drum cooled to 40° C. to form a three-layer laminate composed of two outermost (surface) layers A and one intermediate layer B (ABA). The co-extruded laminate was cooled and solidified on the casting drum, thereby obtaining an unstretched sheet.

The thus obtained unstretched film was stretched at a draw ratio of 3.4 times at a film temperature of 82° C. in the longitudinal direction by difference between peripheral speeds of rolls. Then, the water-based coating material P1 having a composition as shown in Table 2 was applied onto both surfaces of the longitudinally stretched film, and the resultant coated film was introduced into a tenter where the film was stretched at a draw ratio of 3.6 times at 120° C. in the transverse direction. The obtained film was heat-treated at 225° C., annealed at a relaxation percentage of 2% in the transverse direction, and then rolled up at a production speed of 30 m/min., thereby obtaining a laminated polyester film provided thereon with a 0.1 μm-thick coating layer which film had a thickness of 100 μm and an intrinsic viscosity of 0.61.

Next, a hard coat resin was applied onto the coating layer of the thus obtained laminated film in such an amount that the cured hard coat layer had a thickness of 6 μm, and then irradiated with light from a 120 W energy high-pressure mercury lamp positioned 100 mm apart from the film for about 10 seconds, thereby obtaining a surface-cured film. Meanwhile, "KAYANOVA FOP-1700" produced by Nihon Kayaku Co., Ltd., was used as the hard coat resin.

After the "FOP-1700" resin was cured to form the cured film by irradiating with light from a 120 W energy high-pressure mercury lamp positioned 100 mm apart from the film for about 10 seconds, the refractive index of the cured film was measured using an Abbe's refractometer (with a light source D65). As a result, it was confirmed that the cured resin had a refractive index of 1.54. The evaluation results of the obtained film are shown in Table 4.

Example 2

The same procedure as defined in Example 1 was conducted except that the polyesters (B), (C) and (D) were blended together in amounts of 89%, 1% and 10%, respectively, to prepare a raw mixture for layer B which was melted at 285° C., extruded on a casting drum cooled to 40° C. to form a single layer sheet and then cooled and solidified thereon to obtain an unstretched sheet, thereby producing a polyester film.

Examples 3 to 6, Reference Example 1 and Comparative Examples 1 to 3

The same procedure as defined in Example 1 was conducted except that kinds and amounts of raw polyesters used for the layers A and B, kind of coating layer formed upon the film formation, and thickness of each of the layers A and B were varied as shown in Table 3, thereby obtaining laminated polyester films.

The evaluation results of the films obtained in the above Examples and Comparative Examples are shown in Table 4.

TABLE 3

| | Thickness of layer A | Thickness of layer B | Raw material for layer A | Raw material for layer B | Coating solution |
|---|---|---|---|---|---|
| Example 1 | 5 | 90 | (B)/(C) = 90/10 | (A)/(D) = 90/10 | P1 |
| Example 2 | | 100 | | (B)/(C)/(D) = 89/1/10 | P1 |
| Example 3 | 6 | 176 | (B)/(C) = 90/10 | (A)/(D) = 95/5 | P2 |
| Example 4 | 5 | 90 | (B)/(C) = 90/10 | (A)/(D) = 90/10 | P1 |
| Example 5 | 5 | 90 | (A)/(C) = 90/10 | (A)/(D) = 90/10 | P1 |
| Example 6 | 5 | 90 | (B)/(C) = 90/10 | (A)/(D) = 90/10 | P3 |
| Reference Example 1 | 5 | 90 | (A)/(C) = 90/10 | (A)/(E) = 90/10 | P1 |
| Comparative Example 1 | 5 | 90 | (B)/(C) = 90/10 | (A)/(D) = 98/2 | P1 |
| Comparative Example 2 | 5 | 90 | (B)/(C) = 50/50 | (A)/(D) = 90/10 | P1 |
| Comparative Example 3 | 5 | 90 | (A)/(C) = 90/10 | (A)/(D) = 90/10 | — |

TABLE 4

| Examples and Comparative Examples | Film haze | Transmittance at 380 nm | Color tone b* value | Color tone Visual observation |
|---|---|---|---|---|
| Example 1 | 0.9 | 0.5 | 0.6 | A |
| Example 2 | 1.0 | 0.3 | 0.6 | A |
| Example 3 | 1.0 | 0.2 | 0.9 | A |
| Example 4 | 0.9 | 0.0 | 1.2 | B |
| Example 5 | 0.9 | 1.0 | 0.6 | A |
| Example 6 | 0.9 | 1.0 | 0.6 | A |
| Reference Example 1 | 0.9 | 0.5 | 2.0 | C |
| Comparative Example 1 | 0.9 | 17.5 | 0.5 | A |
| Comparative Example 2 | 2.3 | 0.5 | 0.6 | A |
| Comparative Example 3 | 0.9 | 0.5 | 0.6 | A |

| Examples and Comparative Examples | Absolute reflectance Rs (%) | Absolute reflectance Rmin (%) | ΔR (-) | Conditions after heat-treatment at 180° C. for 10 min Haze (%) | Conditions after heat-treatment at 180° C. for 10 min OL amount on surface (mg/m²) |
|---|---|---|---|---|---|
| Example 1 | 5.7 | 4.4 | 1.3 | 1.0 | 4.6 |
| Example 2 | 5.7 | 4.4 | 1.3 | 1.0 | 0.8 |
| Example 3 | 5.7 | 4.2 | 1.5 | 1.4 | 8.2 |
| Example 4 | 5.7 | 4.6 | 1.1 | 1.0 | 4.5 |
| Example 5 | 5.7 | 4.6 | 1.1 | 8.0 | 30.0 |
| Example 6 | 5.7 | 3.2 | 2.5 | 1.0 | 4.5 |
| Reference Example 1 | 5.7 | 4.6 | 1.1 | 1.0 | 5.3 |
| Comparative Example 1 | 5.7 | 4.4 | 1.3 | 1.0 | 4.5 |

TABLE 4-continued

| Comparative Example 2 | 5.7 | 4.6 | 1.1 | 2.7 | 9.0 |
| Comparative Example 3 | 5.8 | 6.2 | -0.4 | 0.9 | 1.4 |

| Examples and Comparative Examples | Adhesion to hard coat layer | | Interference patterns of hard coat | Total evaluation |
|---|---|---|---|---|
| | Initial | Durability | | |
| Example 1 | A | A | A | A |
| Example 2 | A | A | A | A |
| Example 3 | A | A | A | A |
| Example 4 | A | A | A | B |
| Example 5 | B | C | A | B |
| Example 6 | A | A | C | B |
| Reference Example 1 | A | A | A | C |
| Comparative Example 1 | A | A | A | C |
| Comparative Example 2 | A | A | A | C |
| Comparative Example 3 | D | — | C | C |

Example 7

The above polyesters (B) and (C) were blended with each other in amounts of 90% and 10%, respectively, to prepare a raw mixture for a layer A, and the above polyesters (A) and (D) were blended with each other in amounts of 90% and 10%, respectively, to prepare a raw mixture for a layer B. The raw mixtures were respectively supplied to two extruders, melted at 285° C., and then co-extruded on a casting drum cooled to 40° C. to form a three-layer laminate composed of two outermost (surface) layers A and one intermediate layer B (ABA). The co-extruded laminate was cooled and solidified on the casting drum, thereby obtaining an unstretched sheet.

The thus obtained unstretched sheet was stretched at a draw ratio of 3.4 times at a film temperature of 83° C. in the longitudinal direction by difference between peripheral speeds of rolls. Then, the water-based coating material P1 having a composition as shown in Table 2 was applied onto both surfaces of the longitudinally stretched film, and the resultant coated film was introduced into a tenter where the film was stretched at a draw ratio of 3.6 times at 120° C. in the transverse direction. The obtained film was heat-treated at 225° C., annealed at a relaxation percentage of 2% in the transverse direction, and then rolled up at a production speed of 30 m/min., thereby obtaining a laminated polyester film provided thereon with a 0.1 μm-thick coating layer which film had a thickness of 100 μm and an intrinsic viscosity of 0.60. Meanwhile, the thickness of each of the layers A was 5 μm, and the thickness of the layer B was 90 μm.

Examples 8 to 14, Reference Example 2 and Comparative Examples 4 to 5

The same procedure as defined in Example 7 was conducted except that kinds and amounts of raw polyesters used for the layers A and B, kind of coating layer formed upon the film formation, and thickness of each of the layers A and B were varied as shown in Table 5, thereby obtaining laminated polyester films.

Example 15

The same procedure as defined in Example 7 was conducted except that the heat-treating temperature after the transverse stretching was changed to 140° C., thereby obtaining a laminated polyester film.

The evaluation results of the films obtained in the above Examples and Comparative Examples are shown in Tables 5 to 7.

TABLE 5

| Examples and Comparative Examples | Thickness of layer A (μm) | Thickness of layer B (μm) | Raw material for layer A | Raw material for layer B | Coating solution |
|---|---|---|---|---|---|
| Example 7 | 5 | 90 | (B)/(C) = 90/10 | (A)/(E) = 90/10 | P1 |
| Example 8 | 5 | 90 | (A)/(C) = 90/10 | (A)/(E) = 90/10 | P1 |
| Example 9 | 5 | 90 | (A)/(C) = 90/10 | (A)/(F) = 90/10 | P1 |
| Example 10 | 6 | 172 | (A)/(C) = 90/10 | (A)/(E) = 95/5 | P1 |
| Example 11 | — | 100 | — | (A)/(C)/(E) = 89/1/10 | P1 |
| Example 12 | 5 | 90 | (A)/(C) = 90/10 | (A)/(E) = 90/10 | — |
| Example 13 | 5 | 90 | (A)/(C) = 90/10 | (A)/(E) = 90/10 | P3 |
| Example 14 | 6 | 172 | (A)/(C) = 90/10 | (A)/(H)/(F) = 87.5/10/2.5 | P1 |
| Example 15 | 5 | 90 | (A)/(C) = 90/10 | (A)/(E) = 90/10 | P1 |
| Reference Example 2 | 5 | 90 | (A)/(C) = 90/10 | (A)/(G)/(E) = 89/1/10 | P1 |
| Comparative Example 4 | 5 | 90 | (A)/(C) = 50/50 | (A)/(E) = 90/10 | P1 |
| Comparative Example 5 | 5 | 90 | (A)/(C) = 90/10 | (A)/(E) = 95/5 | P1 |

TABLE 6

| Examples and Comparative Examples | Film haze | Total light transmittance | Transmittance at 380 nm | Rs | Rmin | ΔR |
|---|---|---|---|---|---|---|
| Example 7 | 1.0 | 91 | 1.0 | 5.7 | 4.4 | 1.3 |
| Example 8 | 1.0 | 91 | 1.0 | 5.6 | 4.2 | 1.4 |
| Example 9 | 1.0 | 91 | 1.0 | 5.5 | 4.2 | 1.3 |
| Example 10 | 1.0 | 91 | 1.0 | 5.6 | 4.3 | 1.3 |
| Example 11 | 1.0 | 91 | 1.1 | 5.7 | 4.2 | 1.5 |
| Example 12 | 1.0 | 88 | 1.1 | 5.8 | 4.5 | 1.3 |
| Example 13 | 1.0 | 91 | 1.1 | 5.5 | 3.0 | 2.5 |
| Example 14 | 1.0 | 91 | 3.7 | 5.6 | 4.2 | 1.4 |
| Example 15 | 1.0 | 91 | 1.1 | 5.5 | 3.9 | 1.6 |
| Reference Example 2 | 1.0 | 71 | 1.1 | 5.6 | 4.3 | 1.3 |
| Comparative Example 4 | 2.5 | 90 | 1.1 | 5.8 | 4.4 | 1.4 |
| Comparative Example 5 | 1.0 | 91 | 8.0 | 5.6 | 4.2 | 1.4 |

TABLE 7

| Examples and Comparative Examples | Shrinkage percentage in longitudinal direction | Shrinkage percentage in transverse direction | UV light resistance |
|---|---|---|---|
| Example 7 | 1.2 | 0.1 | A |
| Example 8 | 1.2 | 0.1 | A |
| Example 9 | 1.2 | 0.1 | A |
| Example 10 | 1.2 | 0.1 | A |
| Example 11 | 1.2 | 0.1 | A |
| Example 12 | 1.2 | 0.1 | A |

TABLE 7-continued

| Example | | | |
|---|---|---|---|
| Example 13 | 1.2 | 0.1 | A |
| Example 14 | 1.2 | 0.1 | B |
| Example 15 | 5.0 | 6.0 | A |
| Reference Example 2 | 1.2 | 0.1 | A |
| Comparative Example 4 | 1.2 | 0.1 | A |
| Comparative Example 5 | 1.2 | 0.1 | A |

| Examples and Comparative Examples | HC adhesion strength | HC interference patterns | Optical applicability (total evaluation) |
|---|---|---|---|
| Example 7 | A | A | A |
| Example 8 | B | A | A |
| Example 9 | B | A | A |
| Example 10 | B | A | A |
| Example 11 | C | A | B |
| Example 12 | D | A | B |
| Example 13 | B | C | B |
| Example 14 | B | A | B |
| Example 15 | B | A | B |
| Reference Example 2 | B | A | C |
| Comparative Example 4 | B | A | C |
| Comparative Example 5 | B | A | C |

What is claimed is:

1. A polyester film for display which comprises:

a polyester film substrate containing an ultraviolet light absorber; and a coating layer formed on at least one surface of said polyester film substrate, said polyester film having a haze of not more than 2.0% and a light transmittance at 380 nm of not more than 5.0%, and which polyester film has ΔR of not more than 2.0%, said ΔR being defined by the formula:

$$\Delta R = Rs - Rc(\min.)$$

where Rs is an average value of absolute reflectance values as measured on a surface of the coating layer in a wavelength range of 2,400 to 2,000 nm; and Rc(min.) is a minimum value of absolute reflectance values as measured on a surface of the coating layer in a wavelength range of 300 to 800 nm.

2. A polyester film for display according to claim 1, wherein the ultraviolet light absorber is a benzoxazinone-based ultraviolet light absorber.

3. A polyester film for display according to claim 1, wherein the polyester film substrate is a laminated film having at least three layers.

4. A polyester film for display according to claim 3, the ultraviolet light absorber is contained in an intermediate layer of the at least three layers of the laminated film.

5. A polyester film for display according to claim 1, having a color tone b* value of not more than 1.5.

6. A polyester film for display according to claim 1, wherein a total amount of oligomers present on front and rear surfaces of the polyester film after the film is heat-treated at 180° C. for 10 minutes, is not more than 15 mg/m².

7. A polyester film for display according to claim 1, having a total light transmittance of not less than 75%.

8. A polyester film for display according to claim 1, having a shrinkage percentage of not more than 2.0% in each of longitudinal and transverse direction thereof after heat-treated at 100° C. for 5 minutes.

9. An anti reflective film for display comprising a polyester film which comprises:

a polyester film substrate containing an ultraviolet light absorber; and a coating layer formed on at least one surface of said polyester film substrate, said polyester film having a haze of not more than 2.0% and a light transmittance at 380 nm of not more than 5.0%, and which anti reflective film has ΔR of not more than 2.0%, said ΔR being defined by the formula:

$$\Delta R = Rs - Rc(\min.)$$

where Rs is an average value of absolute reflectance values as measured on a surface of the coating layer in a wavelength range of 2,400 to 2,000 nm; and Rc(min.) is a minimum value of absolute reflectance values as measured on a surface of the coating layer in a wavelength range of 300 to 800 nm.

10. An anti reflective film for display according to claim 9, wherein the ultraviolet light absorber is a benzoxazinone-based ultraviolet light absorber.

11. An anti reflective film for display according to claim 9, wherein the polyester film substrate is a laminated film having at least three layers.

12. An anti reflective film for display according to claim 11, the ultraviolet light absorber is contained in an intermediate layer of the at least three layers of the laminated film.

13. An anti reflective film for display according to claim 9, wherein said polyester film has a color tone b* value of not more than 1.5.

14. An anti reflective film for display according to claim 9, wherein a total amount of oligomers present on front and rear surfaces of the polyester film after the film is heat-treated at 180° C. for 10 minutes, is not more than 15 mg/m².

15. An anti reflective film for display according to claim 9, wherein said polyester film has a total light transmittance of not less than 75%.

16. An anti reflective film for display according to claim 9, wherein said polyester film has a shrinkage percentage of not more than 2.0% in each of longitudinal and transverse direction thereof after heat-treated at 100° C. for 5 minutes.

* * * * *